(12) United States Patent
Lenzing et al.

(10) Patent No.: US 6,684,692 B1
(45) Date of Patent: *Feb. 3, 2004

(54) DEVICE FOR MEASURING AT LEAST ONE PARAMETER OF A MEDIUM FLOWING IN A LINE (75) Inventors: Thomas Lenzing, Benningen (DE); Wolfgang Mueller, Rutesheim (DE); Dieter Tank, Kornwestheim (DE); Uwe Konzelmann, Asperg (DE); Henning Marberg, Weil der Stadt (DE)

(73) Assignee: Robert Bosch GmbH, Stuttgart (DE)

(*) Notice: Subject to any disclaimer, the term of this patent is extended or adjusted under 35 U.S.C. 154(b) by 192 days.

This patent is subject to a terminal disclaimer.

(21) Appl. No.: 09/831,155
(22) PCT Filed: Sep. 5, 2000
(86) PCT No.: PCT/DE00/03046
§ 371 (c)(1), (2), (4) Date: Dec. 19, 2001
(87) PCT Pub. No.: WO01/18498
PCT Pub. Date: Mar. 15, 2001

(30) Foreign Application Priority Data

Sep. 7, 1999 (DE) ......................................... 199 42 501

(51) Int. Cl.⁷ .................................................. G01F 1/68
(52) U.S. Cl. .................... 73/202.5; 73/204.21
(58) Field of Search .............................. 73/202, 202.5, 73/204.21, 204.22

(56) References Cited

U.S. PATENT DOCUMENTS

| 4,210,016 A | * | 7/1980 | Peter et al. ................. 73/118.2 |
| 4,433,576 A | * | 2/1984 | Shih et al. ................. 73/204.21 |
| 4,713,970 A | * | 12/1987 | Lambert .................... 73/861.95 |
| 5,918,279 A | * | 6/1999 | Hecht et al. ............. 73/204.21 |

* cited by examiner

Primary Examiner—Harshad Patel
(74) Attorney, Agent, or Firm—Ronald E. Greigg (57) ABSTRACT A device for measuring at least one parameter of a medium flowing in a line, in particular the intake air mass of an internal combustion engine in which fluid particles and solid particles in the line influence a characteristic curve behavior of a measuring element which is used to determine a parameter of the flowing medium. A protective screen according to the invention deflects fluids and solid particles away from the measuring element in such a way that they are conveyed against an inner wall of the line. In addition, the device stabilizes the flowing medium by generating longitudinal eddies in a flow direction.

22 Claims, 7 Drawing Sheets

DEVICE FOR MEASURING AT LEAST ONE PARAMETER OF A MEDIUM FLOWING IN A LINE

CROSS-REFERENCE TO RELATED APPLICATIONS

This application is a 35 USC 371 application of PCT/DE 00/03046 filed on Sep. 5, 2002.

BACKGROUND OF THE INVENTION

1. Field of Invention

The invention is based on a device for measuring at least one parameter of an air flow mass flowing in an air intake line of an internal combustion engine.

2. Description of Prior Art

DE 44 07 209 C2 has disclosed a measuring body that can be inserted into a clean conduit of an intake line of an internal combustion engine to measure the mass of intake air, a so-called air mass sensor, which has a flow conduit that is essentially made up of a measurement conduit, which tapers in the main flow direction, and an adjoining S-shaped deflection conduit. A measuring element is disposed in the tapering measurement conduit. The measuring element can be embodied as a micromechanical sensor part with a dielectric membrane, as has been disclosed, for example, by DE 43 38 891 A1 and U.S. Pat. No. 5,452,610. The penetration of water into the intake line, for example due to travel on a road wet with rain, can result in contamination of the measuring element. Natural amounts of dissolved salts contained in this splashed water then cause a measurement characteristic curve deviation due to the buildup of salt encrustation on the membrane of the sensor part.

DE 197 35 664 A1 discloses a device in which the measuring element is disposed inside a tubular body that the medium flows through, in which an upstream end of the tubular body extends into a filter chamber and has inlet openings there on a circumference surface in order to reduce the action of dirt particles or water droplets on the measuring element. Particularly with severely contaminated air and a high water content in the intake air of the internal combustion engine, there is the danger that the air filter will become laden with water which then penetrates the filter mat and thereby carries dirt particles along with it. On the downstream side of the air filter, the actually clean side, there is now the danger that the intake air will once again carry along dirt particles and water droplets from the filter surface which will then be undesirably deposited on the measuring element and lead to incorrect measurements or to a failure of the measuring element. Through the placement of inlet openings on the circumference surface, the tubular body according to the prior art does in fact reduce the danger of deposits on the measuring element, but this embodiment produces an undesirable pressure drop which leads to a reduction of the measurement sensitivity.

U.S. Pat. No. 5,507,858 has also disclosed using a screen-like perforated plate in a housing which is connected to a line in order to separate out fluid particles from the air or a gas medium flowing in the line. This housing, though, has two outlets, one for the gas or the air and a second for the fluid. A perforated plate or wire mesh that is circulated around in an approximately longitudinal direction, however, also has the property that a more or less favorable through flow perpendicular to the openings of the perforated plate or wire mesh occurs depending on the angle at which it is set. The through flow capacity of the openings is also a function of the degree of turbulence, the speed of the flowing medium, and the surface roughness of the screen used. Thus the air mass sensor positioned downstream of the wire mesh or the perforated plate produces considerable divergences from a reference without a screen in particular speed ranges, i.e. the measurement of the mass of the flowing medium is supplied under certain circumstances with large tolerances from component to component.

DE 196 47 081 A1 describes screens with different screen opening cross sections. These screens, however, are used to achieve a uniform speed profile and not as a protective screen for a measuring element disposed downstream.

SUMMARY OF THE INVENTION

The device according to the invention has the advantage over the prior art that a measuring element can be simply protected from fluid and solid particles and consequently, a measurement characteristic curve deviation is prevented by virtue of the fact that a screen surface—which is disposed in the line upstream of the measuring element, upstream of a measuring body, or upstream of a tubular body containing the measuring element or the measuring body and which constitutes at least one protective screen—influences the medium flowing toward the measuring element, a gas/fluid mixture, in such a way that the fluid particles and solid particles are conveyed toward a tubular wall or a line wall. As a result, the gas also remains in a center of the line or tubular body and deviations in the measurement signal of the measuring element are reduced through conditioning of the flowing medium by virtue of the fact that longitudinal eddies are produced in a flow direction.

An advantageous embodiment of the protective screen is a configuration of one or more cones, wherein the cone tip(s) is/are aligned counter to a main flow direction and the cone(s) is/are disposed symmetrically around a line parallel to the center line of the line itself because as a result, the flowing medium once again flows in the main flow direction after passing through the protective screen. In this connection, it is advantageous that this line passes through a center of the measuring element or an inlet opening of the measuring body.

Another advantageous embodiment of the protective screen is a combination of side screens which enclose an acute angle with one another.

In this connection, it is advantageous if at least one longitudinal axis of a damming region extends parallel to a longitudinal axis of the measuring element and both of these axes intersect a center line of the line because as a result, the flowing medium once again flows in the main flow direction after passing through the protective screen.

In the embodiment of the protective screen with its screen surfaces, it is advantageous to have a center line of the screen openings to extend inclined in relation to the main flow direction because this causes a deflection of the fluid particles and solid particles.

At high flow speeds and a high fluid content, it is advantageous to enlarge the screen surface area by virtue of the fact that at least two protective screens are inserted into the line, where the one protective screen partially protrudes into the downstream end of the other protective screen.

At high flow speeds, it is advantageous for there to be a smaller cone angle or smaller protective screen internal angle; at low flow speeds, it is advantageous for there to be a larger cone angle or protective screen internal angle.

When there are pulsations in the flow, it is advantageous to also dispose a protective screen with an attack edge or attack tip counter to the return flow direction downstream of the measuring element in the line.

The insertion of a tubular body into the line in addition to the protective screen offers further advantages in the reduction of the action of solid particles and fluid on the measuring element.

Notches and triangular wedges in the attack edge of the protective screen are an advantageous modification to stabilize or condition the flowing medium so that a reproducible measurement of the air mass is possible.

Deviations that occur during the measurement of air mass in different flow testing stands are minimized. Jumps in the air mass characteristic curve are sharply reduced.

In this connection, it is advantageous to dispose the wedges or notches uniformly along the attack edge and upstream, at the level of the measuring element or the inlet opening of the measuring body.

BRIEF DESCRIPTION OF THE DRAWINGS

Exemplary embodiments of the invention are described herein below and are depicted in a simplified fashion in the drawings, in which:

FIGS. 3a, b show different possible placements of the protective screen in the line, FIG. 7 shows a disposition of a tubular body in the line, FIGS. 8a, b show a protective screen and a device with notches, and FIGS. 9a, b show a protective screen and a device with wedges.

DESCRIPTION OF THE PREFERRED EMBODIMENTS

Figure 1:
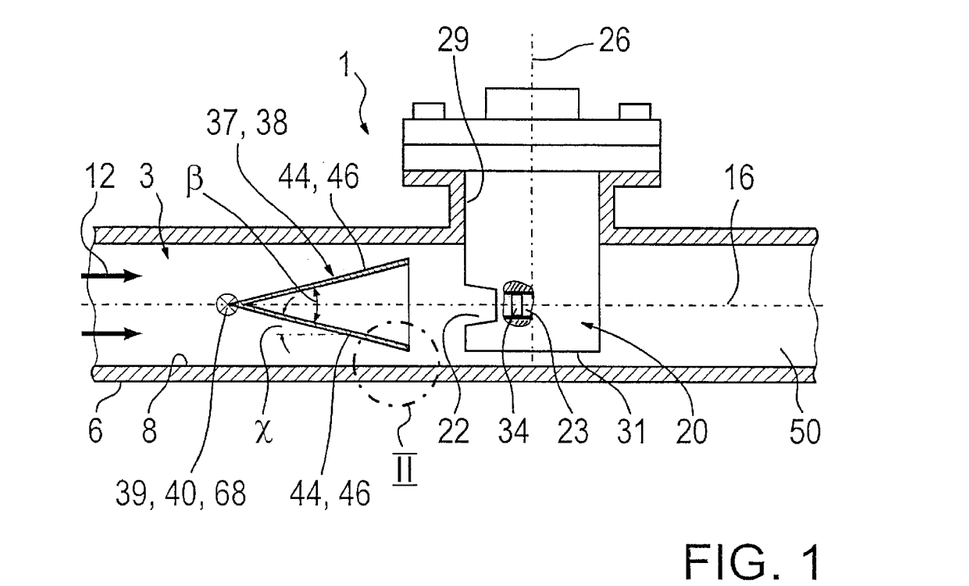
FIG. 1 shows an exemplary embodiment of the device according to the invention.

FIG. 1 shows a device 1 for measuring at least one parameter, in particular of an air mass flow, of a medium flowing in a line 3, in particular the intake air mass flow of an internal combustion engine. Parameters of a flowing medium include, for example, the air mass flow for determining an air mass, a temperature, a pressure, or a flow speed, which are determined by means of suitable sensors. It may be necessary to use the device 1 for measuring other parameters. The line 3 has an external wall surface 6 and an internal wall surface 8. The medium flows in the line 3 in the main flow direction 12, which is indicated by arrows. The line 3 has a center line 16. For example, a measuring body 20 extends in the line 3. The measuring body 20 can, for example, be a temperature sensor of the kind disclosed by DE 42 28 484 C2, a pressure sensor of the kind used in DE 31 35 794 A1, or an air mass sensor which determines the corresponding parameter. An air mass sensor has been selected here as an example for the different sensors, which is disposed for example in the measuring body 20.

For example, the measuring body 20 has an inlet opening 22 into which the medium flows and a bypass conduit connected to it. A measuring element 34 is disposed in the bypass conduit 23. A measuring body 20 of this kind is known to the specialist from DE 197 35 891 A1, which is incorporated into this disclosure by reference.

The air mass taken in by an internal combustion engine can be changed arbitrarily by means of a throttle valve, not shown, that is disposed in the intake tube of the engine, in a line end 50 downstream of the line 3.

The measuring body 20, which is essentially embodied as oblong and block shaped and extends along the longitudinal axis 26, is provided for determining the intake air mass of the internal combustion engine. The longitudinal axis 26 extends essentially perpendicular to the center line 16 and thereby also to the main flow direction 12. The measuring body 20 is, for example, partially inserted through an insertion opening 29 in the wall 6 and protrudes with a free end 31 into the line 3. A connector end of the measuring body 20 that contains the electrical connections, for example in the form of connector tabs, thereby remains outside the line 3. In a known manner, the measuring body 20 contains a measuring element 34 which remains in contact with the air flowing through the line 3 and determines the air mass taken in by the internal combustion engine. In a known manner, the measuring element 34 can be embodied in the form of temperature-dependent resistors. In particular, it is possible to embody the measuring element, as has been disclosed for example by DE 43 38 891 A1 and U.S. Pat. No. 5,452,610, as a micromechanical component with a dielectric membrane, on which resistance elements are embodied.

In order to prevent the measuring element 34 from being undesirably acted on by solid particles or fluid, a protective screen 38 is disposed at least partially upstream of the measuring element 34 inside the line 3 and serves as a first means 37 for manipulating the flowing medium.

The protective screen 38 has, for example, two screen surfaces 46. In this instance, the screen surfaces 46 are constituted, for example, by means of two side screens 44 which, when combined, comprise the protective screen 38. Each side screen 44 has for example a flat, arc-shaped, or elliptically oval form. The geometry of the protective screen 38 can also be conically embodied so that the protective screen 38 is constituted by one screen surface 46. A cone tip 41 (FIG. 6b) or an attack edge 40 in a contact the line of the side screen 44 of the protective screen 38 is aligned counter to the main flow direction 12. These parts 40, 41 constitute a damming region 39 of the protective screen because the flowing medium cannot flow through the attack edge 40 or the attack tip 41 but instead is dammed up there. The attack edge 40 extends, for example, through the center line 16. For example, the attack edge 40 is also perpendicular to the center line 16; however, it can also be oriented otherwise.

The attack edge 40 constitutes a damming region longitudinal axis 68, which protrudes perpendicularly up from the plane of the drawing. Preferably, at least one attack tip 41 is also aligned with the center line 16. The protective screen 38 is preferably symmetrical to a line extending parallel to the center line 16. This line extends, for example, through a center point of the measuring element 34 or the inlet opening 22.

The protective screen 38 here has a V-shaped cross section, for example, and is aligned with its side screens 44, for example, so that the side screens 44 protrude perpendicularly up from the plane of the drawing. The side screens 44 are combined so that they enclose a protective screen internal angle β between themselves, which is an acute angle. The for example flat side screen 44 encloses an attack angle χ with the main flow direction 12. A flow rectifier can also be installed in the line 3 downstream of the measuring body 20.

On the upstream end, the protective screen 38 can be integrated into a ring, for example, which contains a second flow rectifier for the medium flowing in the line 3.

Figure 2:
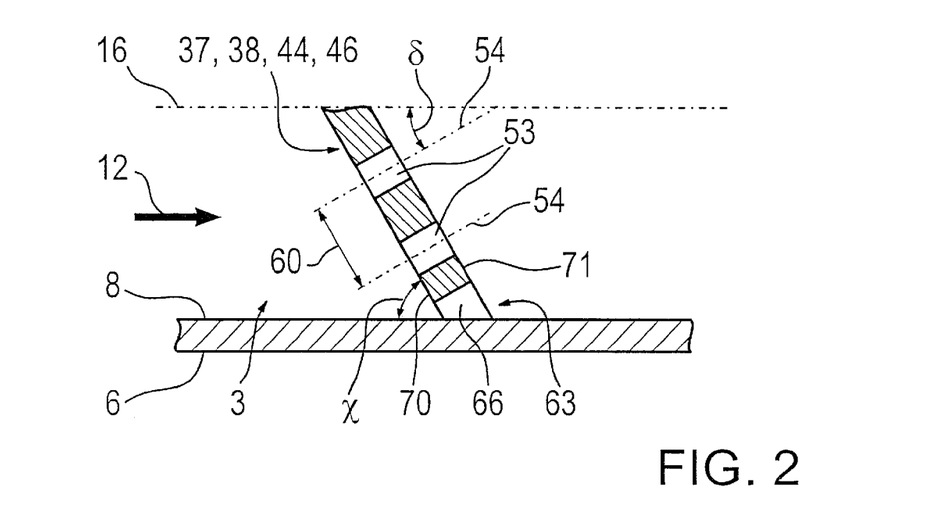
FIG. 2 shows a protective screen in an enlarged detail from FIG. 1.

FIG. 2 shows a protective screen 38 in an enlarged detail from FIG. 1. In FIG. 2 and the FIGS. that follow, parts which are the same or function in the same manner are provided with the same reference numerals as in FIG. 1. The protective screen 38 has screen openings 53, which have an opening center line 54. The screen openings 53 do not necessarily have to have a straight opening center line 54. The opening center line 54 encloses an angle δ with the center line 16 of the line 3.

The opening center lines 54 of the screen openings 53 do not have to be parallel to one another. Consequently, for example, the screen openings 53 that are disposed in the vicinity of the inner wall 8 can have a greater angle δ than the screen openings 53 that are disposed in the vicinity of the center line 16. As a result, the screen openings 53 can be suitably adapted to a speed profile of the flowing medium.

The screen openings have a particular screen opening distance 60 from one another. The screen opening distance 60 does not necessarily have to be equal for all of the screen openings 53.

DE 196 47 081 A1, which is incorporated into this disclosure, describes screens with different screen opening cross sections. The screen openings can be adapted to the flowing medium in order to obtain a uniform and/or focused flow.

The inclination of the side screen 44 gives the side screen 44 a downstream end 63. Between the downstream end 63 and the inner wall 8 of the line 3, for example, an open outlet opening 66 is provided which is embodied either by virtue of the fact that the downstream end 63 terminates spaced apart from the inner wall 8 or by virtue of the fact that the downstream end 63 does in fact extend to the inner wall 8, but the outlet opening 66 is recessed into the screen 38, 44 or the inner wall 8.

The screen 38, 44 can be embodied both as a small gage wire mesh or as a thin plate that has screen openings 53 disposed in a screen pattern. Plastic, metal, ceramic, or glass can be used as a material for both the wire mesh and the plate-shaped protective screen. The plate-shaped protective screen made of plastic can be produced, for example, through injection molding or through producing the screen openings by means of a material-removing process. The plate-shaped protective screen made of metal can be produced out of sheet metal, for example, by means of stamping, erosion, drilling, etc.; the edge elements (slats) encompassing the screen openings can also be somewhat inclined in relation to the screen surface 46 by means of bending. A protective screen 38 which has a high degree of surface roughness increases the wetting with fluid and therefore increases adhesion. A fluid film is produced which permits fluid particles which strike against it to slide off. The thermal capacity and electrostatic action of the material of the protective screen 38 also influences the action of fluid particles or solid particles. An angular form of the slats that constitute the protective screen 38 yields a greater contact surface area than round slats.

If the intake air coming into the line 3 contains dirt particles and fluid droplets, then part of these settle on the screen surface 46 and move predominantly toward the downstream end 63 of the protective screen 38; this occurs both on a front surface 70 of the screen surface 46 oriented counter to the flow direction 12 and on a rear surface 71 oriented in the flow direction 12. From the downstream end 63, this deposited fluid is carried along by the intake air, for example from the front surface 70 into the outlet opening 66 and predominantly adheres to the inner wall 8. The intake air carries the fluid, which also contains extremely fine dirt particles and is in the form of extremely fine fluid droplets or a thin fluid film, further along the inner wall in the flow direction 12, past the measuring body 20 and measuring element 34 to the tube end 50 downstream of the measuring body 20.

Depending on the fluid quantity contained in the air, the protective screen 38 can be embodied in several structural variants. The surface roughness and surface form, the protective screen interior angle β, the mesh width, and the material can be considered as potentially changeable in this connection. The surface roughness and consequently in general, the material of the protective screen as well as the form of the screen wire or the slats, influences the adhesion of fluid droplets to the protective screen 38, 44 by means of the contact angle. The attack angle χ of the protective screen 38, 44 permits fluid particles to be deflected depending on the flow speed; the attack angle χ should become flatter as the particle speed increases. Finally, the mesh width determines the size of the droplets to be deflected.

Figures 3, 3A, 3B:
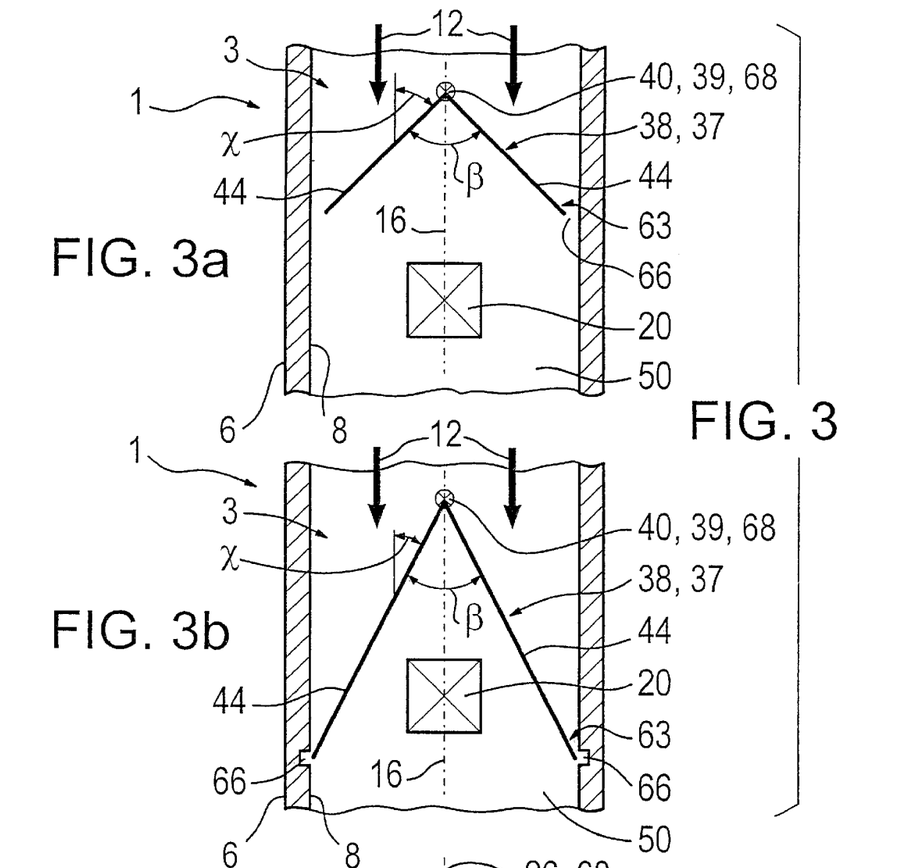

FIGS. 3a and 3b show different possible placements of the protective screen 38 in the line 3.

FIGS. 3a and 3b show a top view of the device, looking into the line 3 in the direction of the longitudinal axis 26. The protective screen 38 according to FIG. 1 has been rotated here by 90° around the center line 16.

FIG. 3a shows a protective screen 38, which is disposed, for example, entirely upstream of the measuring body 20 and the measuring element 34 in the main flow direction 12 and does not extend out to the inner wall 8. The outlet opening 66 is then constituted by a free region between the downstream end 63 of the side screen 44 and the inner wall 8.

FIG. 3b shows another possible placement. The protective screen 38 is disposed only partially upstream of the measuring body 20 and the measuring element 34, and in this instance, for example, extends out to the inner wall 8. The outlet opening 66 is then embodied, for example, in the screen 38, 44, but can also be provided in the inner wall 8.

The embodiments in both FIG. 3a and FIG. 3b cause fluid particles and solid particles to be conveyed past the measuring body 20 or measuring element 34.

Figure 4:
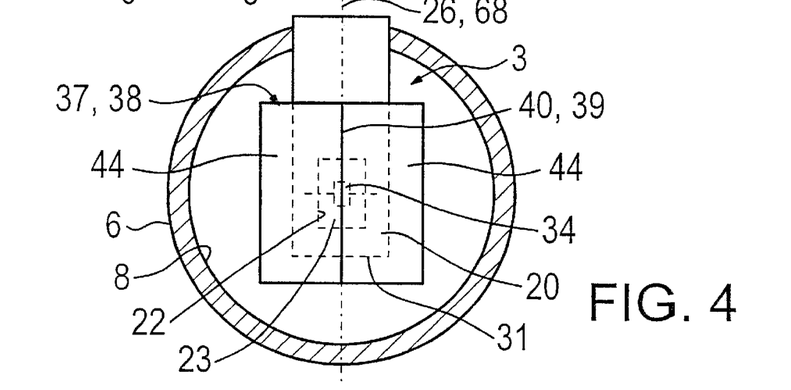
FIG. 4 shows a device viewed in the main flow direction.

FIG. 4 shows a device 1, for example according to FIG. 3, viewed in the main flow direction 12.

The measuring element 34 is disposed, for example, downstream of the inlet opening 22 in the bypass conduit 23 of the measuring body 20. The attack edge 40 of the protective screen 38 in this instance extends, for example, parallel to the longitudinal axis 26 of the measuring body 20. Thus the attack edge 40 constitutes the damming region 39 and has a damming region longitudinal axis 68 extending parallel to the longitudinal axis 26. The protective screen 38 in this example extends inside the line 3 only part way in the cross section of the line 3. It is sufficient, for example, if the inlet opening 22 is protected from the medium flowing in the main flow direction 12 by the protective screen 38.

Figure 5A:
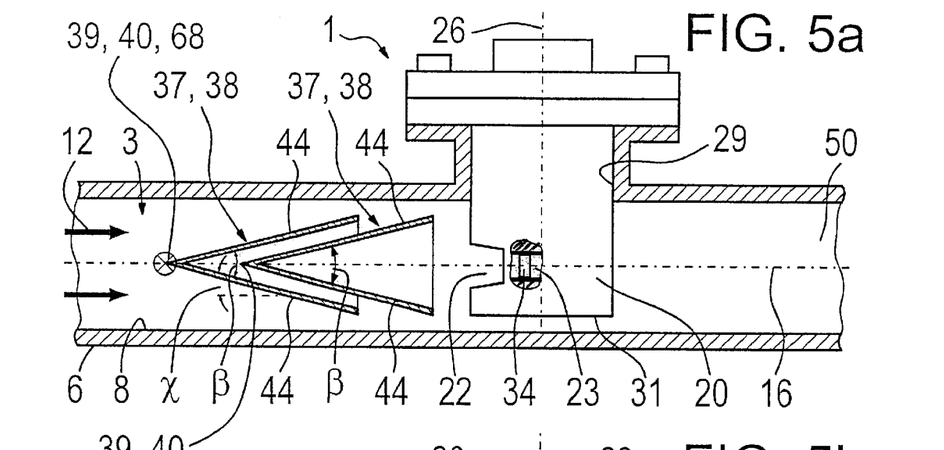
FIGS. 5a–e show exemplary embodiments for different operating conditions, FIGS. 6a, b show flow lines upstream and downstream of a protective screen.
Figure 5B:
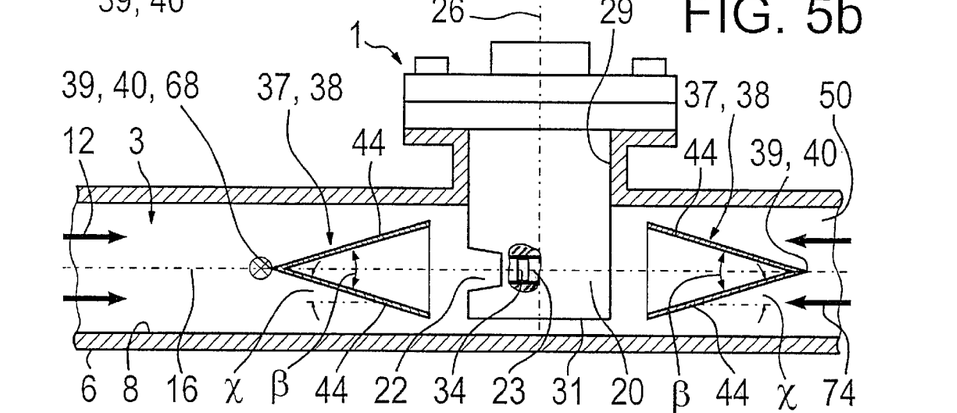
Figure 5C:
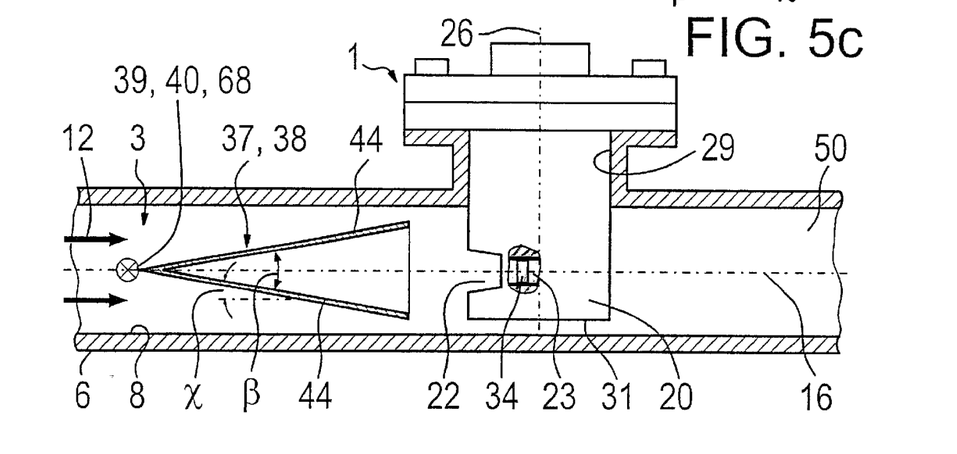

FIGS. 5a to 5e show exemplary embodiments for different operating conditions of the protective screen 38. A configuration of multiple protective screens 38, in this case a configuration of two of them, is used when there is a high fluid content in the flowing medium (FIG. 5a). Fluid particles or solid particles which are not deflected by the screen that is struck first by the flow in the main flow direction 12 are deflected by the second protective screen 38. The second protective screen 38 is disposed, for example, partially inside the first protective screen. However, this is not required. If the two protective screens 38 are slid together so tightly that a drainage occurs between the respective side screens 44, then this increases the adhesion of the fluid particle grains 44 because of the greater contact surface area.

The protective screen internal angle β and therefore the attack angle χ do not necessarily have to be equal. Consequently, the attack angle χ of the downstream protective screen can be adapted to the speed which has been changed by the preceding protective screen 38.

This multiple configuration is also possible with any other form of the protective screen 38, for example a protective screen 38 with four side screens that are arranged in the form of a W or through the use of conical protective screens 38. Other combinations of protective screens 38 with different geometries are also conceivable.

When there are pulsations in the medium flow, this produces a return flow 74 which can bring fluid particles and dirt particles back from the zone downstream of the inlet opening 22 toward the zone upstream of the inlet opening 22, counter to the main flow direction 12. In the exemplary embodiment according to FIG. 5b, therefore, a protective screen 38 embodied comparably to the ones according to FIGS. 1 and 3 is provided, which is disposed downstream of the measuring element 34 and has an attack edge 40 oriented counter to the return flow direction 74, which minimizes such effects. The protective screen internal angle β of the protective screen 38 for the return flow does not have to be identical to that of the other protective screen 38 for the main flow direction 12. This is useful since the speed profile, speed, and fluid content differ between the return flow and the main flow.

Figure 5D:
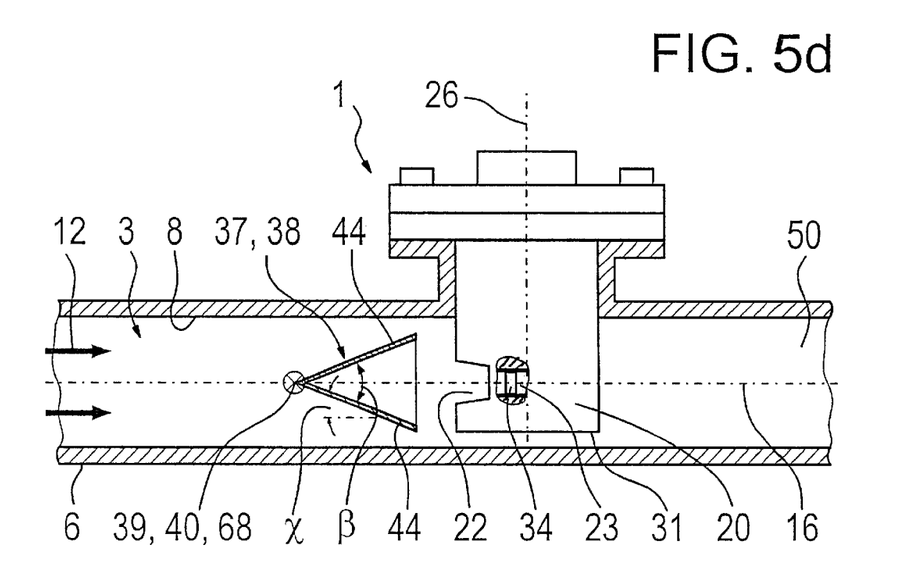

An optimal form of the protective screen 38 also depends on the flow speeds of the medium in the line 3. In flow engineering, usually a small attack angle χ is used at high flow speeds. Consequently, a for example small protective screen angle β is used here as well for the protective screen 38 (FIG. 5c) and at low flow speeds, a greater protective screen internal angle β is used (FIG. 5d). A greater span of the protective screen 38 in the main flow direction 12 with a small protective screen internal angle β is produced because the intent is to achieve a particular coverage of the line 3 in the cross section, i.e. a protective action.

At high flow speeds and a high fluid content, the screen surface 46 can also be enlarged by virtue of the fact that in principle, at least two protective screens are inserted into the line 3 next to each other in a W shape, which have a common attack edge 40 approximately at the level of the center line 16 (FIG. 5e) and are comprised of four side screens 44, 44'. The for example two screen surfaces 44' closer to the center line 16 are for example curved in this instance.

Figure 5E:
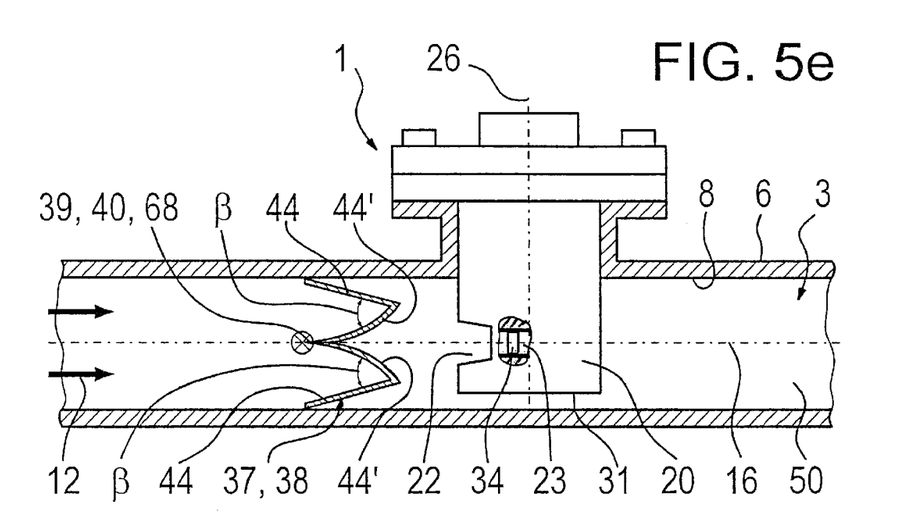

The screen surfaces 44 closer to the wall 6 broaden the speed profile of the flowing medium and slow down the flow speed. Thus the speed of the flowing medium can be greater without the flow speed downstream of the protective screen 38 for the measuring element 34 being too great. The screen surfaces 44, 44' can also be conical, i.e. the protective screen 38 is comprised for example of two or more cones, whose cone tips are not oriented counter to the main flow direction 12, i.e. they point downstream. The protective screen internal angle β of the side screens 44' in this example can differ from the protective screen internal angles β of the side screens 44, 44'. Thus the speed profile can be influenced in a concerted manner in the center of the line 3 and at the edge.

Figure 6A:
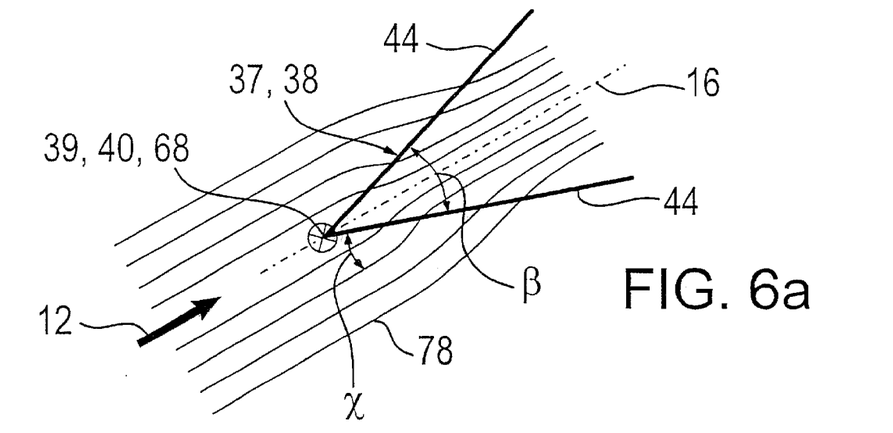

FIG. 6a shows flow lines 78 that constitute a speed profile, upstream and downstream of a protective screen 38 in terms of the main flow direction 12, which protective screen corresponds, for example, to the one from FIG. 3a or 3b.

The flowing medium strikes the attack edge 40 and the side screen 44 of the protective screen 38. The screen openings 53 deflect the flow direction of the medium during a certain flow section and focus it in a manner that corresponds to the action of an optical lens system. Downstream of the deflected flow section, the flow lines 78 once again run approximately parallel to the center line 16.

Figures 6B, 7:
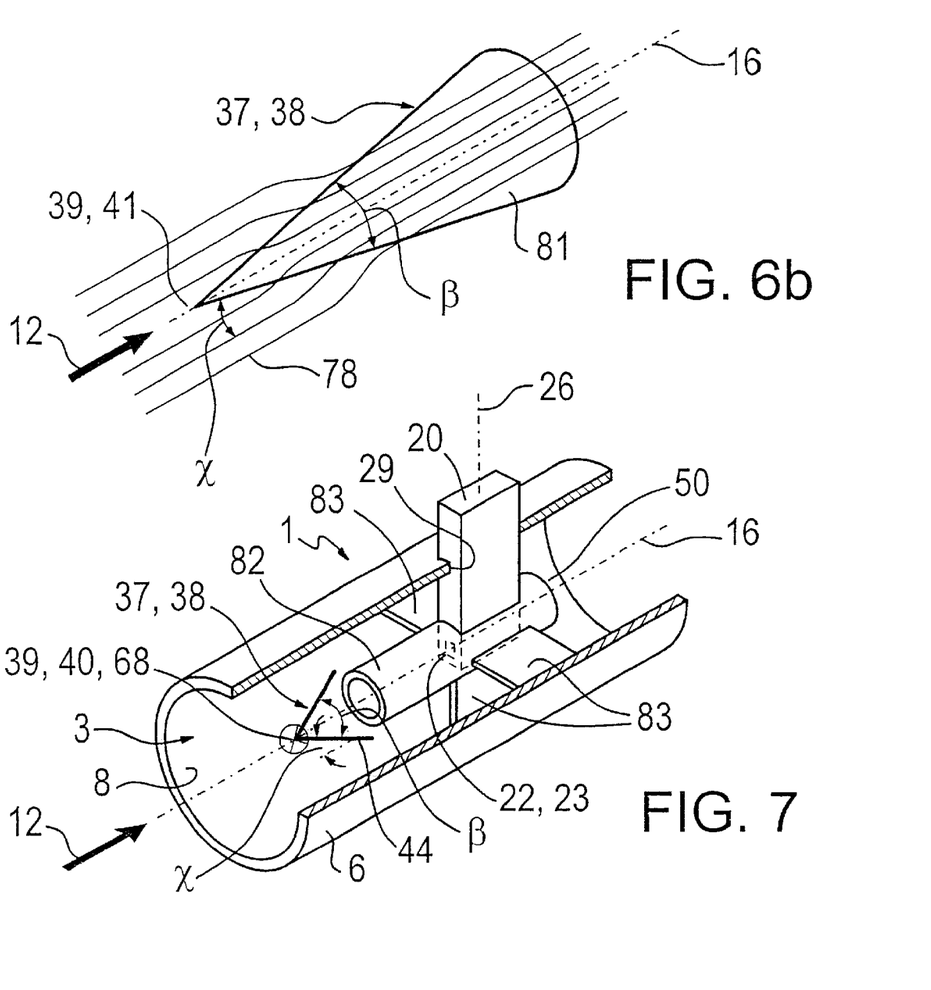

FIG. 6b shows the flow lines 78 for another exemplary embodiment of a protective screen 38. The protective screen 38 is a cone, for example, and has a cone outer surface 81 and an attack tip 41. The cone outer surface 81 is for example flat, but can also be curved. When the protective screen 38 is acted on by a flowing medium, it acts as a collecting line, similar to an optical lens, i.e. the flow lines of the incoming flow upstream of the screen are focused downstream of it, and consequently the flow speed there is increased.

FIG. 7 shows the disposition of a tubular body 82, which the medium circulates around, in the line 3, which body extends, for example, spaced radially apart from the line 3 and has a smaller cross section than the line. The measuring body 20 extends in the tubular body 82 and the measuring element 34 is disposed inside the tubular body 82. The tubular body 82 is affixed in the line 3, for example by means of struts 83. The protective screen 38 is disposed upstream of the tubular body 82. It is also conceivable to dispose the protective screen 38 in the tubular body 82.

As described above for the line 3, in this instance as well, the intake air carries the fluid, which also contains extremely fine dirt particles and is in the form of extremely fine fluid droplets or a thin fluid film, further along the inner wall in the flow direction 12, past the measuring body 20 and measuring element 34 to the tube end 50 downstream of the measuring body 20, from which the clinging fluid detaches and is carried by the surrounding flowing intake air to the engine.

Figure 8A:
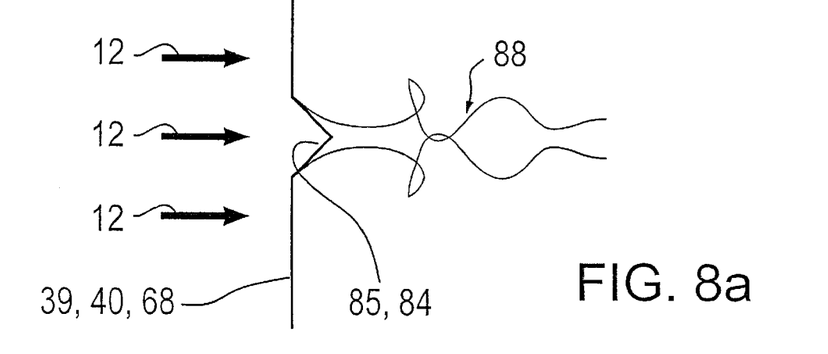
Figure 8B:
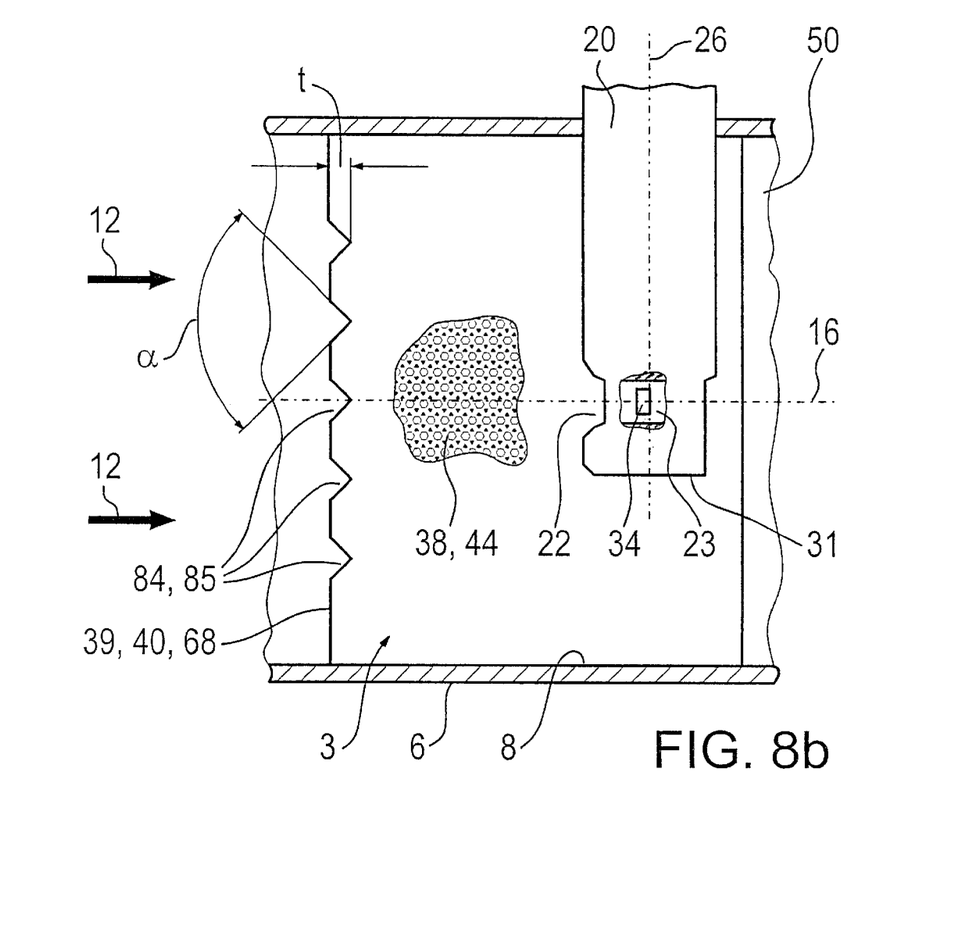

FIGS. 8a, b show the protective screen 38 made up of at least two side screens 44, with a notch 85 in the attack edge 40.

In order to condition and stabilize the through flow of the protective screen 38, the notches 85 generate, as a second means 84 for stabilizing the flowing medium, a so-called longitudinal eddy flow 88 (FIG. 8a), whose course is schematically depicted with lines. The longitudinal eddy flow 88 is produced as in a delta wing of an airplane, by circulation around the front edges. Several notches 85 can be provided along the entire attack edge 40. Ideally, the notches 85 are disposed, for example, only in the central region of the attack edge 40, e.g. in five to ten different positions. For example, the distances between the individual notches 85 are preferably uniform (FIG. 8b). The notches 85 extend to a depth t in the direction of the measuring body 20 and have an opening angle α (FIG. 8b).

Dimensions of the notches 85 must be adapted to respectively occurring flow speeds. In a speed range from 0 to 50 m/s, for example, notches of approximately t=2 mm deep and an opening angle of α=45° . . . 90° must be provided.

Figure 9A:
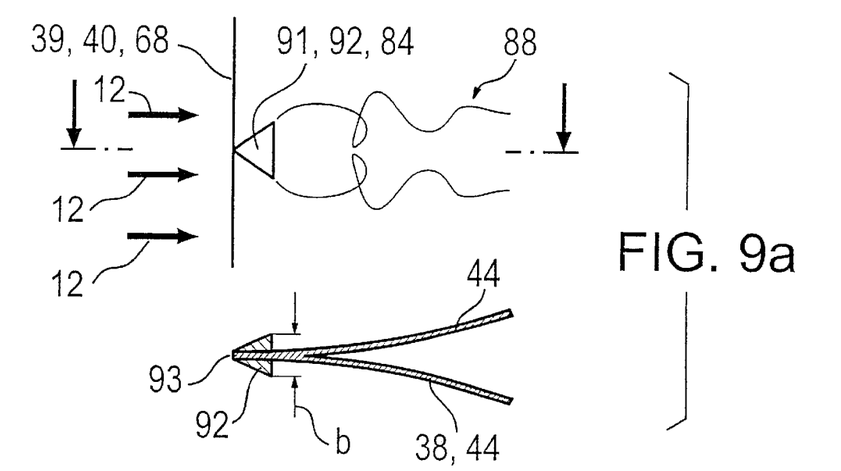

For generating longitudinal eddies 88, it is likewise conceivable to attach small pyramid-shaped or conical wedges 92 to the attack edge 40, as an element 91 with a stabilization attack edge 93, whose point is oriented counter to the main flow direction.

Figure 9B:
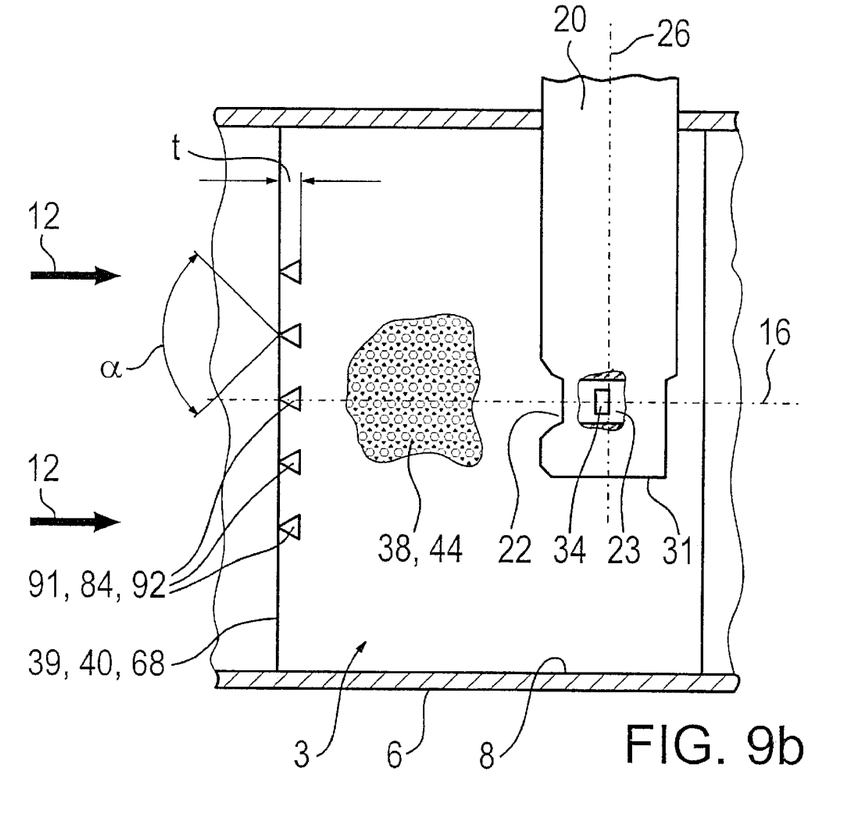

FIG. 9a shows a protective screen 38 with a wedge 92. Dimensions and disposition along the attack edge 40 similar to the notches 85 should also be used with the pyramid-shaped or conical wedges 92 (FIG. 9b). A side surface of the wedge 92, which the medium flows against, can also be curved, for example. Lateral to the main flow direction 12, the wedge 92 has a width b. Preferably, widths of b=0.5 . . . 1 mm are provided. In order to generate particularly powerful longitudinal eddies, even greater widths b must be used.

The foregoing relates to preferred exemplary embodiments of the invention, it being understood that other variants and embodiments thereof are possible within the spirit and scope of the invention, the latter being defined by the appended claims.

What is claimed is:

1. In a device (1) for measuring at least one parameter, in particular an air mass flow, of a medium flowing in a line (3), in particular the intake air mass of an internal combustion engine, with a measuring element (34) that the medium flows around, the improvement comprising at least one first means (37, 38, 46) for manipulating the flowing medium placed at least partially upstream of the measuring element (34) inside the line (3), wherein the flowing medium in the line (3) is comprised of different components and the flowing medium in the line (3) has regions of flow and a speed profile, and wherein at least one screen surface (46) is used as a first means (37) for manipulating the components and the speed profile of the flowing medium, and wherein some of the components of the flowing medium are manipulated to flow in a region of flow which does not touch the measuring element (34).

2. The device according to claim 1, wherein said at least one screen surface (46) comprises at least a part of a protective screen (38), wherein a region of the protective screen (38) is a damming region (39) in which the flowing medium is dammed, and wherein the at least one protective screen (38) has at least one damming region (39).

3. The device according to claim 2, wherein said at least one protective screen (38) is comprised of at least two screen surfaces (46), and wherein the directly adjacent screen surfaces constitute an acute angle—a protective screen internal angle β—in relation to each other and constitute side screens (44) of the at least one protective screen (38).

4. The device according to claim 3, wherein said at least one protective screen (38) has at least one attack edge (40), which constitutes the at least one damming region (39).

5. The device according to claim 4, wherein at least one damming region (39) of the at least one protective screen (38) has a damming region longitudinal axis (68), wherein the measuring element (34) has a longitudinal axis (26), and wherein the damming region longitudinal axis (68) of the at least one damming region (39) extends parallel to the longitudinal axis (26) of the measuring element.

6. The device according to claim 4, wherein a line extending parallel to the main flow direction (12) extends through the center point of the measuring element (34) or the inlet opening (22), and the at least one protective screen (38) is disposed symmetrical to this line.

7. The device according to claim 3, further comprising at least one second means (84) for stabilizing the flowing medium, said at least one second means being provided along the damming region longitudinal axis (68) as a means for manipulating the flowing medium.

8. The device according to claim 7, further comprising at least one notch (85) in the damming region (39) along the damming region longitudinal axis (68) as at least one second means (84) for stabilizing the flowing medium.

9. The device according to claim 7, further comprising at least one element (91) with a stabilization attack edge (93) is provided in the vicinity of the damming region (39) as at least one second means (84) for stabilizing the flowing medium.

10. The device according to claim 9, wherein said at least one element (91) with a stabilization attack edge (93) is a pyramid-shaped or conical wedge (92).

11. The device according to claim 7, wherein said second means (84) for stabilizing the flowing medium are disposed uniformly along the damming region (39).

12. The device according to claim 7, wherein said at least one second means (84) for stabilizing the flowing medium is disposed upstream at the level of the measuring element (34).

13. The device according to claim 7, wherein said at least one second means (84) for stabilizing the flowing medium is disposed upstream at the level of the inlet opening (22) of the measuring body (20).

14. The device according to claim 2, wherein said at least one protective screen (38) has screen openings (53) with opening center lines (54) that extend inclined in relation to the main flow direction (12) when the protective screen (38) is disposed in the line (3).

15. The device according to claim 2, wherein said protective screens (38) are aligned with their damming regions (39) counter to the main flow direction (12), wherein there is a leading protective screen (38) in terms of the main flow direction (12) and protective screens (38) disposed in series downstream of it, and wherein the damming region (39) of the downstream protective screen (38) is disposed upstream in the main flow direction (12) of a downstream end of the side surface (44) of the preceding protective screen (38).

16. The device according to claim 2, further comprises a tubular body (82) disposed in the line (3), said the at least one protective screen (38) being disposed upstream of the tubular body (82).

17. The device according to claim 2, wherein, when there are pulsations in the medium flow in the line (3), the medium flows in the main flow direction (12) and in a return flow (74) opposite from this main flow direction, and where at least one protective screen (38) downstream of the measuring element (34) is aligned with its at least one attack edge (40) counter to the return flow direction (74).

18. The device according to claim 1, wherein said at least one protective screen (38) is embodied as a cone or as a multiple cone and at least one cone outer surface (81) constitutes the screen surface (46).

19. The device according to claim 18, wherein said conical protective screen (38) has an attack tip (41) which the flowing medium flows against in the main flow direction (12) and which constitutes the at least one damming region (39).

20. The device according to claim 18, wherein said at least one conical protective screen (38) is disposed symmetrical to a cone center line extending parallel to the center line (16) of the line (3).

21. The device according to claim 20, further comprising a measuring body (20), a bypass conduit (23) with an inlet opening (22) in said measuring body, said measuring element (34) being disposed in said bypass conduit (23), said measuring element (34) and the inlet opening (22) having a center point, and wherein the cone line extends through the center point of the measuring element (34) or inlet opening (22).

22. The device according to claim 18, wherein said that the protective screen (38) has an interior spatial cone angle or protective screen internal angle β and that at high flow speeds, the spatial cone angle or protective screen internal angle β is small and at low flow speeds, the spatial cone angle or protective screen internal angle β is large.

* * * * *